INVENTOR.
Robert Crane

Fig. 5.

INVENTOR.
Robert Crane

United States Patent Office 3,621,833
Patented Nov. 23, 1971

3,621,833
METHOD AND APPARATUS FOR AUTOMATICALLY DETERMINING PHYSIOLOGICAL PARAMETERS RELATED TO HUMAN BREATHING AIRWAY RESISTANCE AND FUNCTIONAL RESIDUAL CAPACITY
Robert Crane, 21 Cynthia Lane, Plainview, N.Y. 11803
Filed June 26, 1969, Ser. No. 836,781
Int. Cl. A61b 5/08
U.S. Cl. 128—2.08
14 Claims

ABSTRACT OF THE DISCLOSURE

Method, system and apparatus for automatic determination of physiological respiratory parameters related to human breathing airway resistance and functional residual capacity are disclosed. The person for whom the determinations are being made is seated within a whole body plethysmograph (closed cabinet) and breathes air which is located therein with him in a sequence of short rapid breaths known as panting, the pressure within the plethysmograph ($P_p$) relative to atmosphere being sensed after a predetermined number of breaths at respective points corresponding to predetermined respective breathing air flow rates ($\dot{V}$) (both inspiratory and expiratory points may be used). The difference in plethysmograph pressure ($\Delta P_p$) at these respective points is determined, which is proportional to changes in "body volume." The breathing flow path is thereafter obstructed by a closed shutter, and the pressure in this obstructed flow path ($P_A$) relative to atmosphere is sensed at respective points when the pressure in the plethysmograph corresponds to that occurring at the predetermined flow rates. The difference in pressure ($\Delta P_A$) in the obstructed flow path at the latter respective points is determined, this difference corresponding to inspiratory and/or expiratory airway resistance ($R_{AI}$ and $R_{AE}$), the ratio between these respective pressure differences indicating the functional residual capacity of the person.

In whole body plethysmography as practiced prior to the present invention attempts have been made by the use of experienced investigators to subjectively interpret the data for determination of breathing airway resistance of a person being examined and thereby to interpret the functional residual capacity of this person with respect to his breathing capacity. The data attempted to be generated by such prior subjective interpretation requires an undue amount of effort, attention and experience on the part of the investigator, which may lead to unrecognized inaccuracies. In any event, the prior interpretive results are very difficult to obtain and are not readily repeatable.

Among the many advantages of the method, system and apparatus embodying the present invention for automatically determining physiological respiratory parameters related to human breathing airway resistance and functional residual capacity are those resulting from the fact that the results are accurately repeatable and the use of subjective interpretation is avoided. A minimum amount of effort, attention and experience are required on the part of the investigator, and if desired the results can be automatically determined.

In accordance with the present invention the person for whom the determinations are being made is asked to enter a whole body plethysmograph, a cabinet which is closed about him, the person usually being seated therein. Equilibrium temperature conditions are allowed to occur and thereafter the person breathes air which is located within the plethysmograph with himself. His breaths are counted, and the pressure within the plethysmograph ($P_p$) is sensed after a predetermined number of breaths at respective points corresponding to predetermined respective breathing rates ($\dot{V}$) during a complete cycle of breathing, i.e., during both inspiratory and expiratory phases. The difference in plethysmograph pressures ($\Delta P_p$) at these respective points is determined, which is proportional to changes in "body volume." The breathing flow path is thereafter obstructed by a closed shutter in a breathing tube through which the person has been breathing, and the attempted breaths are again counted. After a predetermined number of attempted breaths have occurred the pressure in the obstructed flow path ($P_A$) is sensed at respective points (i.e. instants in time) when the plethysmograph pressure corresponds to that occurring at the predetermined flow rates mentioned above. The difference in pressure ($\Delta P_A$) in the obstructed flow path at these latter respective points is determined, this difference being proportional to the inspiratory and/or expiratory airway resistance ($R_{AI}$ and $R_{AE}$), and the ratio between these respective pressure differences ($\Delta P_p/\Delta P_A$) is proportional to the functional residual capacity of the person.

In this specification and in the accompanying drawings are described and shown method, system and apparatus for automatically determining physiological parameters related to human breathing airway resistance and functional residual capacity embodying the invention, but it is to be understood that this illustrative example is not intended to be exhaustive nor limiting of the present invention, but on the contrary is given for purposes of illustration in order that others skilled in the art may fully understand the invention and the manner of applying the invention in practical use, so that they may fully understand how to practice the invention in various forms, each as may be best suited to the conditions of a particular use.

The various objects, aspects, and advantages of this invention will be more fully understood from a consideration of the specification in conjunction with the accompanying drawings, illustrating a presently preferred embodiment of the invention, in which.

Figure 1:
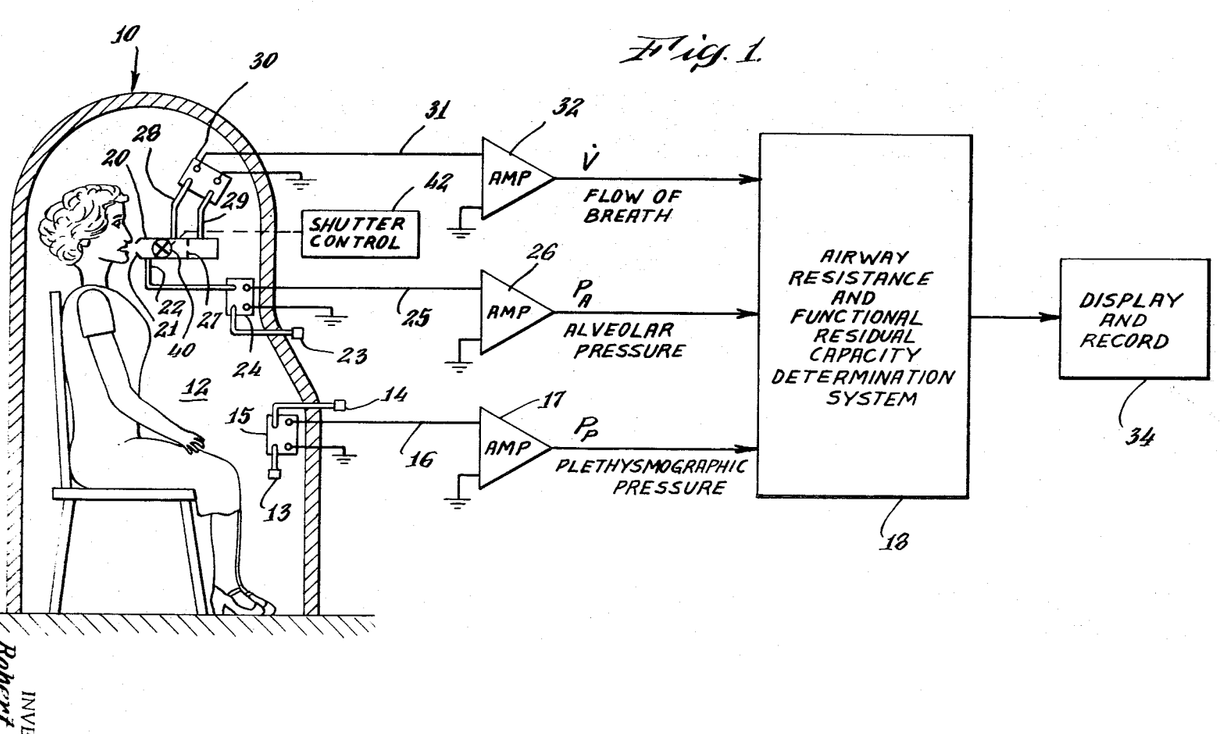
FIG. 1 is a schematic diagram illustrating a system including a plethysmograph and air breath flow and pressure sensors in a system for determining airway resistance, or functional residual capacity, of a human being in accordance with the present invention.

With reference to the FIG. 1 there is shown a plethysmograph 10 shaped to enclose a person's body to reveal variations in the body arising from breathing conditions. Sensors are provided to sense variations in pressure and breath flow during breathing conditions that are controlled as will be described to reveal physiological parameters related to airway breathing resistance and to functional residual capacity of the body.

The plethysmograph of this embodiment is sized to completely enclose a person in a chamber 12 wherein small pressure variations due to changes in body volume arising from breathing action by the person enclosed therein may be accurately sensed. The plethysmograph is, therefore, substantially airtight when closed and is made of a rigid material with a suitable doorway (not shown) for entrance. A pressure sensor tube 13 within the chamber 12 and another pressure sensor tube 14 outside of the chamber are connected to a differential transducer 15 which feeds an electrical signal through a line 16 into a pre-amplifier 17. The electrical signal on line 16 is proportional to the instantaneous pressure within the chamber 12 as compared to atmospheric pressure. The symbol $P_p$ means the instantaneous pressure within the plethysmograph 10 as compared to atmospheric pressure, and is referred to as "plethysmographic pressure" or "plethysmograph pressure."

The person being tested is breathing air within the chamber and as he goes through the phases of a breathing cycle air flows into and out of his lungs from the space surrounding his body.

His "body volume" as used in the specification is intended to mean the effective volume occupied by his body at each instant of time with respect to the total air within the chamber 12, this total air being that which is within the cabinet plus that which is within his lungs and the various passages within his body. This "body volume" changes from instant to instant, and the plethysmographic pressure $P_p$ increases with increasing body volume and decreases with decreasing body volume, i.e. varies in proportion to body volume. Therefore, the plethysmograph pressure $P_p$ corresponds directly to body volume and is used to reveal changes in this physiological parameter.

The output of the pre-amplifier 17 is fed into an airway resistance and functional residual capacity determination system 18.

The person located in chamber 12 breaths through a special tube 20 in communication with the air located in this chamber 12. The tube 20 is provided with a mouthpiece 21. Adjacent the mouthpiece 21 and communicating with the air flow passage through the breathing tube 20 is a pressure sensor tube 22 for sensing the pressure of the air within the person's mouth while another sensor tube 23 responds to atmospheric pressure, the sensor tubes 22 and 23 being connected to a differential transducer 24. Thus the sensed mouth pressure $P_A$ is presented as a differential pressure relative to atmosphere and the transducer 24 provides an electrical signal on line 25 which is amplified in pre-amplifier 26 for use in the system 18.

The symbol $P_A$ for mouth pressure stands for "alveolar pressure" because under certain conditions when there is no breath flow, as will be explained further below, the pressure of the air in the mouth is substantially equal to the pressure of the air within the alveoli (air cells of the lungs).

The breathing tube 20 is further provided with a restriction or orifice 27 to measure breath air flow through this tube. There is a pressure sensor tube 28 and tube 29 communicating with the breath flow on opposite sides of the orifice 27, and these sensors are connected to a differential transducer 30 which provides an electrical signal on line 31 which is representative of the instantaneous rate of breath flow, in suitable measurement units, such as liters of air per second, and this electrical signal, after preamplification in amplifier 32 is passed on to the system 18. The output from the system 18 is used in a utilization device 34 such as a conventional meter display device and a sensitized paper recorder, such as is used with an electrocardiograph measurement.

The end of the tube 20 is further provided with a shutter 40 controlled by a solenoid control network 42. Shutter 40 can be actuated to block the tube so as to enable mouth pressure measurements to be made substantially corresponding to alveolar pressure ($P_A$), as will be described. The shutter 40 and the restriction 27 are adequately sized to assure substantially unhampered breathing. When the shutter 40 is closed, the person in the chamber 12 will be unable to draw air through the tube 20 although he will be exerting himself in attempting to do so. The mouthpiece 21 as actually used has a shape to fit within the person's mouth. Furthermore, a nose clip has been placed on the person to assure that no flow of breath can occur through his nose.

Figures 4A, 4B, 4C, 4D:
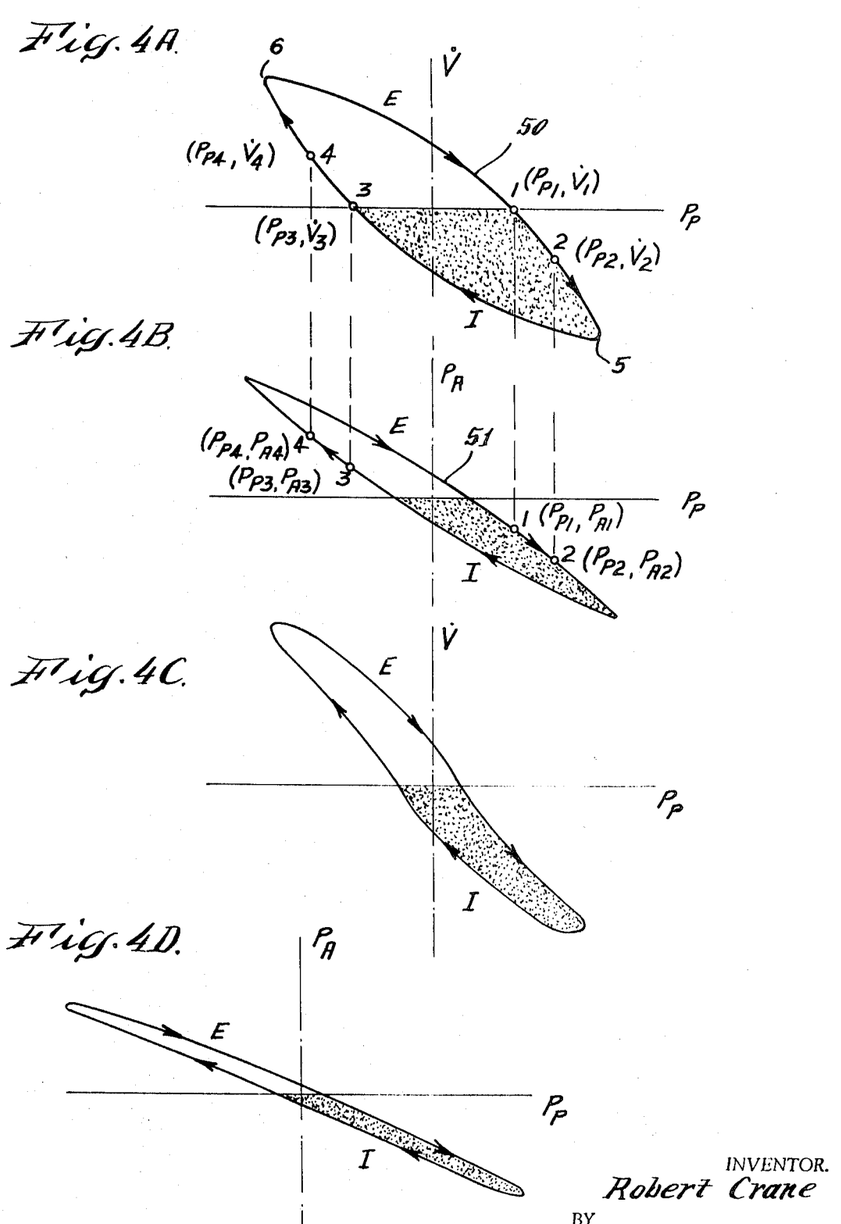
FIG. 4A is a loop plot of breathing airflow velocity plotted versus plethysmographic pressure, including a complete breathing cycle, i.e. both the inspiratory and expiratory phases of breathing. It is to be understood that this is an idealized and exaggerated loop which is shown for the purposes of explanation, the inspiratory (inhalation) phase being shaded and indicated by "I"
FIG. 4B is a loop of alveolar air pressure plotted versus plethysmographic pressure when the air flow is blocked by a closed shutter. This loop plot includes a complete cycle of attempted inspiration and attempted expiration. It is to be understood that this is an idealized and exaggerated loop which is shown for purposes of explanation; the inspiratory phase of attempted breathing is shaded and indicated by "I"
FIGS. 4C and 4D are loop plots corresponding to FIGS. 4A and 4B, respectively, except that FIGS. 4C and 4D are loop plots typical of those obtained when sensing the physiological parameters of a healthy adult person.

With brief reference to the FIG. 4A an idealized and exaggerated plot 50 is shown of the breathing (panting) parameters, $P_p$, plethysmographic or chamber pressure along the abscissa axis and airflow breathing rate $\dot{V}$ in liters per second along the ordinate axis, the shaded portion enclosed by the curve 50 corresponds to the inspiration (inhalation) phase of the cycle and the clear enclosed portion corresponds to the expiration (exhalation) phase of the breathing cycle. The curve 50 in FIG. 4A represents an idealized and exaggerated plot of the data generated during a person's breathing (panting) when the shutter 40 in FIG. 1 is open, permitting unrestricted air flow to the person. FIG. 4B is an idealized and exaggerated loop plot 51 representative of what occurs when the shutter 40 is closed, as will be explained further below. FIGS. 4C and 4D illustrate typical loop plots of a healthy adult, but for purposes of clarity of explanation of the invention reference is made to the loops of FIGS. 4A and 4B.

As a step in the method, it is desired to measure the plethysmographic pressure $P_p$ at respective pairs of points which are predetermined as being points relating to human breathing events which effectively and accurately reveal the desired physiological data. In this illustrative embodiment there are a pair of predetermined points 1 and 2 which are both selected to be on the inspiration phase of the loop 50 and occurring before the point 5 of maximum inspiration flow rate. For example the first point 1 is selected to coincide with the human event that the person is just initiating inspiration. At this point 1 the flow $\dot{V}$ is zero. The plethysmograph pressure and flow rate coordinate values of this first point 1 are identified as $P_{p1}$ and $V_1$.

The second predetermined point 2 is selected as occurring when the inspiration flow rate event is one liter per second. At this second point 2 the plethysmograph pressure is sensed corresponding to the predetermined flow rate event of one liter per second. The coordinate values corresponding to the second point 2 are $P_{p_2}$ and $\dot{V}_2$.

It is to be understood that other points can be selected as desired, for example, to accommodate varying personal breathing abilities, such as of a small child or a person with a severe breathing disability. A third and fourth pair of predetermined points 3 and 4 are both selected to occur on the expiration phase of the loop 50 before the point 6 of maximum expiration flow rate. For example the third point 3 is selected to coincide with the event of just initiating the expiration phase of the cycle when the flow $\dot{V}$ is zero, and the fourth point 4 when the expiration flow is one liter per second. It is to be understood that other values could be predetermined as desired.

Inspiration flow $\dot{V}$ is indicated as negative and expiration flow as positive. As shown in FIG. 4A, the plethysmographic pressure $P_p$, is sensed and the values are stored when $\dot{V}$ is zero, $-1$ liter per second, zero, and $+1$ liter per second.

The sensed parameters of $P_p$ are thus $P_{p_1}$ at $\dot{V}_1$ (onset of the inspiratory phase); $P_{p_2}$ at $\dot{V}_2$; $P_{p_3}$ at $\dot{V}_3$ (onset of the expiratory phase) and $P_{p_4}$ at $\dot{V}_4$ with measurements having been made during both the expiration and inspiration breathing (panting) cycle portions.

The FIG. 4B illustrates a curve 51 representative of the plotting of $P_p$ along the abscissa versus mouth or alveolar pressure $P_A$ when the shutter 40 is closed, i.e. the person in the plethysmograph is breathing against a closed off tube 20. It is desired that the alveolar pressures $P_A$ be sensed for the corresponding plethysmographic pressures of $P_{p_1}$, $P_{p_2}$, $P_{p_3}$, and $P_{p_4}$. The sensed parameters of $P_A$ for the curve 51 are thus $P_{A_1}$ at $P_{p_1}$; $P_{A_2}$ at $P_{p_2}$; $P_{A_3}$ at $P_{p_3}$; and $P_{A_4}$ at $P_{p_4}$.

To understand this method it is to be noted again that the respective plethysmograph pressures at points 1, 2, 3 and 4 on both curves 50 and 51 correspond to the body volume at these points and hence correspond to respective physiological conditions at these points. Moreover, it is noted that the mouth pressure corresponds substantially to alveolar pressure in the case of curve 51 because no flow is occurring. Hence, the theoretical assumption is made that the respective alveolar pressures at the points on curve 51 correspond substantially with the respective rates of flow on curve 50. This assumption is made because the body volume (physiological condition) of the person is the same at the respective points.

Therefore, the alveolar pressure difference $P_{A_2}-P_{A_1}$ is the change in alveolar pressure required to increase flow by a difference of one liter per second from the onset of an inspiratory pant. Dividing this pressure difference by the change in flow (which is one liter per second in this case) yields the inspiratory airway resistance, $R_{A_1}$, in for instance, cm. $H_2O/L/sec.$ (centimeters of water per liter per second). In a similar manner difference values between $P_{A_4}$ and $P_{A_3}$ determine expiratory airway resistance, $R_{A_E}$.

Further computations may be made with these measured parameters as will be described to determine the functional residual capacity of a person.

Figure 2:
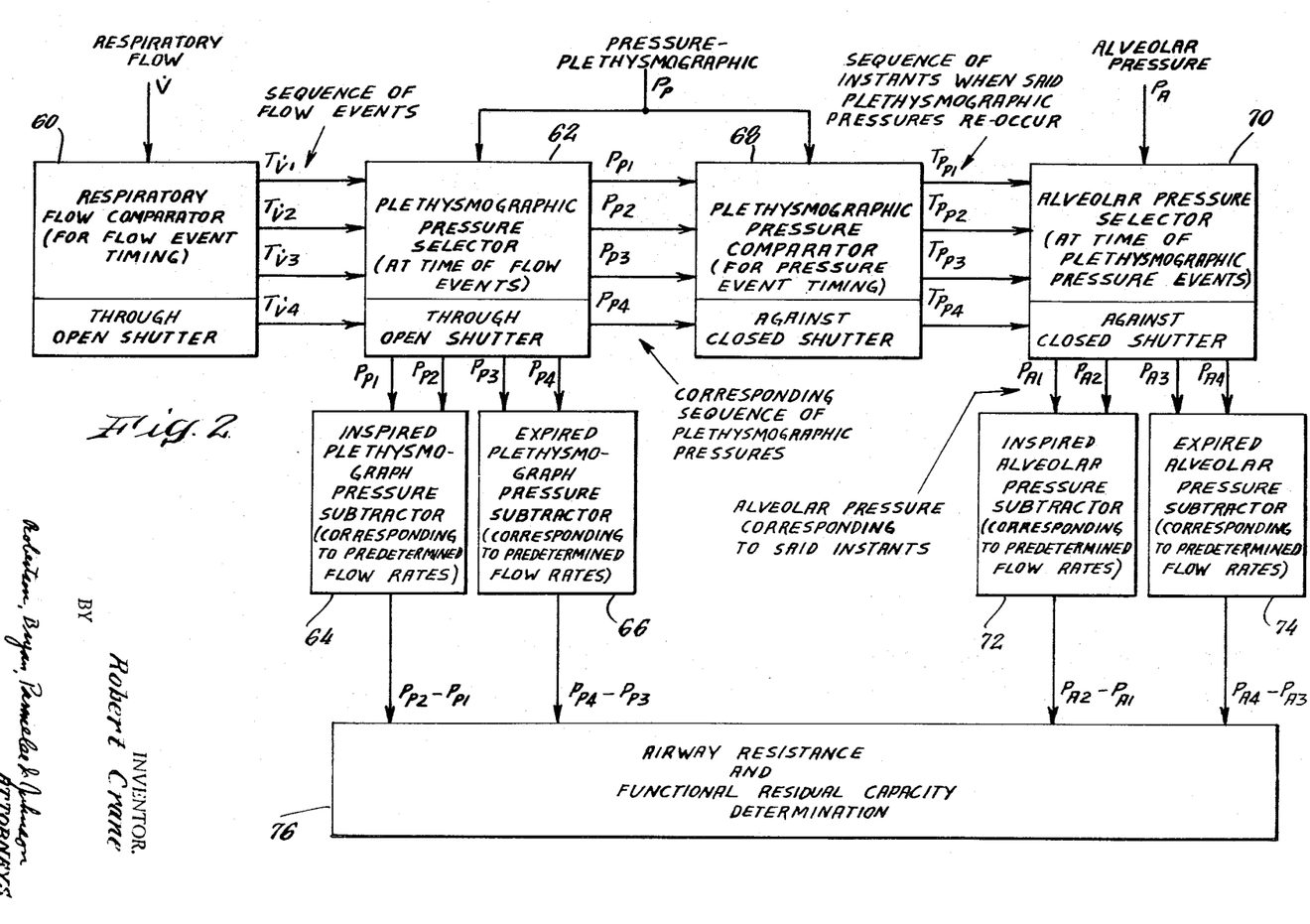
FIG. 2 is a functional schematic diagram showing the method and system embodying the present invention for determining human breathing airway resistance and functional residual capacity.

FIG. 2 illustrates the method steps contemplated in an illustrative embodiment in relation to the curves of FIG. 4A and 4B. The sensed respiratory flow signal $\dot{V}$ is monitored in a network 60 to derive event signals, $^T\dot{V}$ when the flow is zero, $-1$ liter per second, zero, and $+1$ liter per second. The event signals $^T\dot{V}$ initiate sampling of plethysmographic pressure signals $P_p$ in network 62. The sampled $P_p$ pressure signals are then used both to generate difference signals $P_{p_2}-P_{p_1}$ and $P_{p_4}-P_{p_3}$ in networks 64 and 66 respectively as well as being fed into comparator 68 to determine when the alveolar or mouth breathing pressure $P_A$ is to be sampled in network 70. Sampling and storage of the $P_A$ pressure signal is done in network 70 followed by selective subtraction in networks 72 and 74 to form the difference signals $P_{A_2}-P_{A_1}$ and $P_{A_4}-P_{A_3}$.

The functional residual capacity (FRC) of a person may then be determined in network 76 according to the formula $$FRC = k\frac{P_{p_4}-P_{p_3}}{P_{A_4}-P_{A_3}} = k\frac{P_{p_2}-P_{p_1}}{P_{A_2}-P_{A_1}} = \frac{\Delta V \text{ body}}{\Delta P \text{ alveolar}} \times P \text{ atmospheric}$$

In this formula "$k$" is a constant which includes the appropriate scale factors relating the voltages out of the respective amplifiers to the corresponding physiological variables, the scale factor being determined by calibration of the system against known pressures, volumes and flows. The constant $k$ also includes the values of atmospheric pressure in appropriate units.

Experimental test "runs" on numerous persons have shown that this method, system and apparatus based upon the above theoretical assumption, produces actual results which are repeatable and reliable and are significant when compared with results obtained by the prior art test procedures applied to the same persons.

In operation, the person is asked to breath as normally as possible for a period of time sufficient to allow temperature stabilization to occur within the plethysmograph. The person has a nose clamp and is holding the mouthpiece 21 in his mouth. It usually requires about one to three minutes for temperature stabilization to occur.

Then the person is asked to begin panting at the end of a normal expiration, i.e. the panting begins with an inspiration. Typically, the pants occur at a rate of about one pant per second.

In the operation of the plethysmograph system the person holds his cheeks with the palms of his hands to prevent the cheeks from moving and the more accurate results and measurements are obtained after a predetermined number of initial "stabilizing" pants have occurred. For this reason, with reference to the FIG. 3, the system operation is initiated with closure of a start switch 80 that places a breath counter 82 in readiness for counting breaths. The breath counter 82 produces an enabling signal on output line 84 when a particular pant occurs as preselected by means of a control 86. The flow signal $\dot{V}$ is also applied to a flow comparator timing control signal generator 88, which is enabled by the breath counter output on line 84. Hence, the sequence of system operation is delayed until the occurrence of the predetermined pant. The breath counter 82 employs circuitry as will be explained with reference to FIG. 6. The third pant is usually an effective, convenient choice, because it is usually stable and the person has not become unduly tired.

The flow comparator circuit 88 generates four timing signals, $^T\dot{V}_1$, $^T\dot{V}_2$, $^T\dot{V}_3$ and $^T\dot{V}_4$ corresponding respectively to values of airflow of zero, and $-1$ liter per second for inspiration and zero and $+1$ liter per second for expiration. FIG. 4A indicates that these particular preselected flow values correspond to the selected points 1, 2, 3 and 4. These timing control signals are coupled to the plethysmographic pressure selector 62 (see FIG. 2) which in the FIG. 3 takes the form of a first track and hold network 62. The first track and hold network stores plethysmographic pressures occurring at times determined by the control signals from comparator 88. The stored pressure values in the first track and hold circuit 62 are $P_{p_1}$, $P_{p_2}$, $P_{p_3}$ and $P_{p_4}$ which as explained with reference to FIG. 4A relate to inspiration points $P_{p_1}$, $P_{p_2}$, and expiration points $P_{p_3}$ and $P_{p_4}$ respectively. These pressure values are stored as long as desirable to perform the following airway resistance and functional residual capacity determinations.

Figure 3:
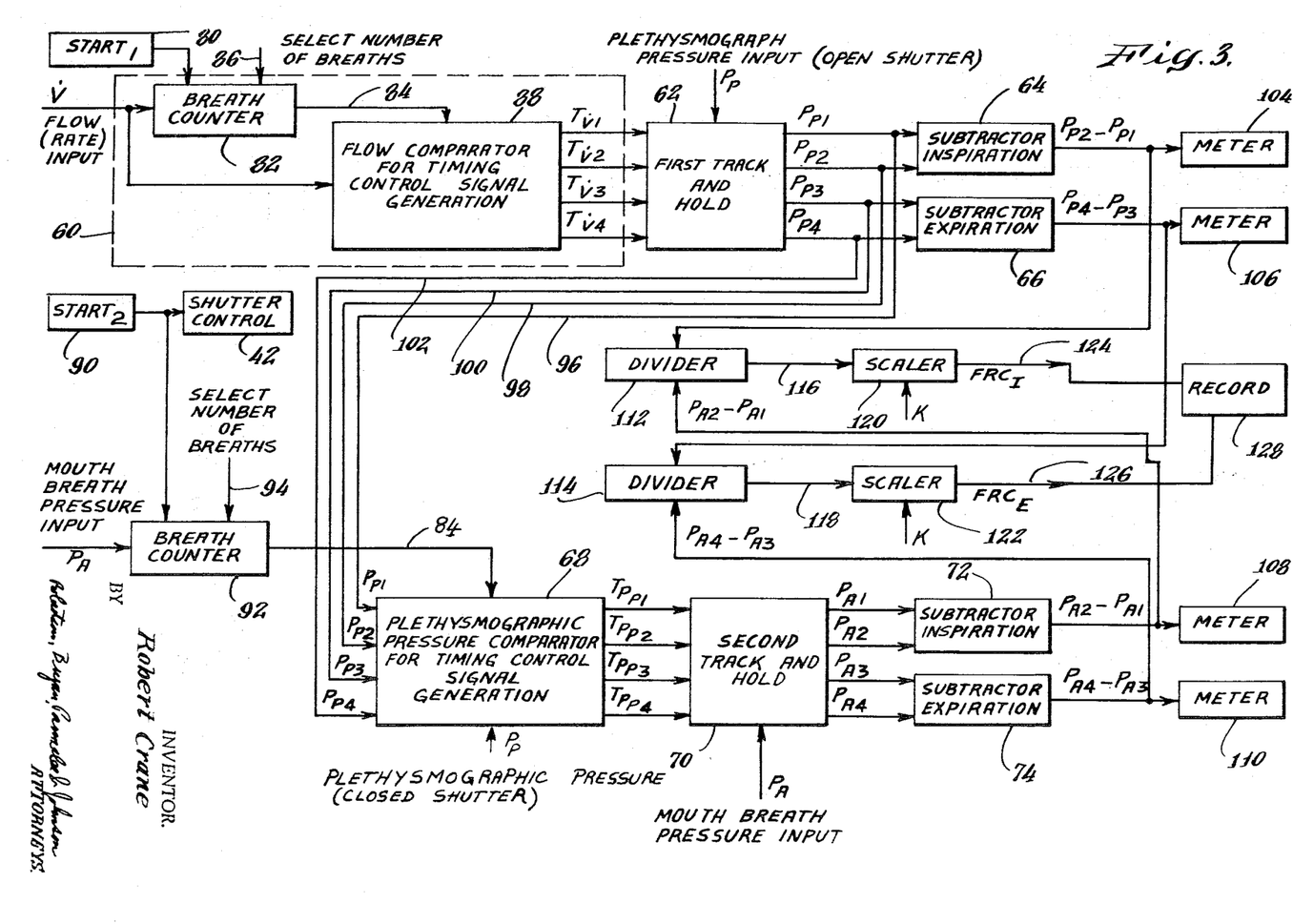
FIG. 3 is a schematic circuit diagram of a system and apparatus for practising the method illustrated and showing further aspects of the illustrative embodiment.

Following the actuation of breath counter 82 and the storage of the $P_{p_1}$ through $P_{p_4}$ values in network 62, the mouth breath pressures are to be sensed and stored. After the shutter is closed, the sensing of mouth pressure is effectuated at the respective instants of re-occurrence of the previously stored plethysmographic pressure. Accordingly, a second start switch 90 is provided which actuates the shutter control network 42 for closure of the shutter 40 and readies a second breath counter 92. This additional breath counter 92 is like counter 82, and may be set by means of control 94 to select the desired attempted pant to be sensed. It is noted that the breath counting with counter 92 is obtained by monitoring the mouth breath pressure signal $P_A$. The third attempted pant is usually an effective, convenient choice for reasons as above.

The stored plethysmographic pressure values $P_{p1}$ through $P_{p4}$ form inputs for the mouth pressure selection, as described with relation to FIG. 4B. The stored pressure signals are fed via lines 96, 98, 100, 102 to the plethysmographic pressure comparator 68. The comparator 68 generates four output timing control signals $TP_{p1}$, $TP_{p2}$, $TP_{p3}$, and $TP_{p4}$ which occur when the plethysmograph pressure $P_p$ re-occurs corresponding to the stored reference pressures $P_{p1}$, $P_{p2}$, $P_{p3}$ and $P_{p4}$, respectively. The timing control signals $TP_{p1}$, $TP_{p2}$, $TP_{p3}$, and $TP_{p4}$ are applied to the mouth breath pressure selector 70 (see FIG. 2), and which takes the form of a second track and hold network 70 in FIG. 3.

The second track and hold network 70 samples the mouth breath pressure $P_A$ at times determined by its timing control input signals to store electrical values corresponding to pressure signals $P_{A_1}$, $P_{A_2}$, $P_{A_3}$, and $P_{A_4}$. The latter stored pressures are mouth breath pressures encountered with the shutter closed, occurring when the plethysmographic pressures $P_p$ equal those pressure signals $P_{p1}$, $P_{p2}$, $P_{p3}$, and $P_{p4}$, which were stored when the shutter was open and corresponding to breath flow occurring at points 1, 2, 3 and 4 on curve 50 (FIG. 4A).

Subtraction networks 64, 66, 72 and 74 are suitably connected to the respective track and hold circuits 62 and 70 to provide the respective difference signals;

$$P_{p_2}-P_{p_1};\ P_{p_4}-P_{p_3};\ P_{A_2}-P_{A_1};\ \text{and}\ P_{A_4}-P_{A_3}$$

These difference signals are each respectively applied to recording or display devices such as meters 104, 106, 108, and 110. In addition these difference signals are coupled to a pair of divider networks 112 and 114 to form the quotients $$\frac{P_{p_2}-P_{p_1}}{P_{A_2}-P_{A_1}}\ \text{and}\ \frac{P_{p_4}-P_{p_3}}{P_{A_4}-P_{A_3}}$$

respectively, on output lines 116 and 118. Each quotient is further multiplied with a scale factor $k$ in scaling amplifiers 120 and 122 to provide inspiratory and expiratory functional residual capacity signals $FRC_I$, and $FRC_E$ on output lines 124 and 126. The FRC signals may be applied to a utilization device such as a recorder 128 to establish a repeatable indication of a person's functional residual capacity.

Figure 5:
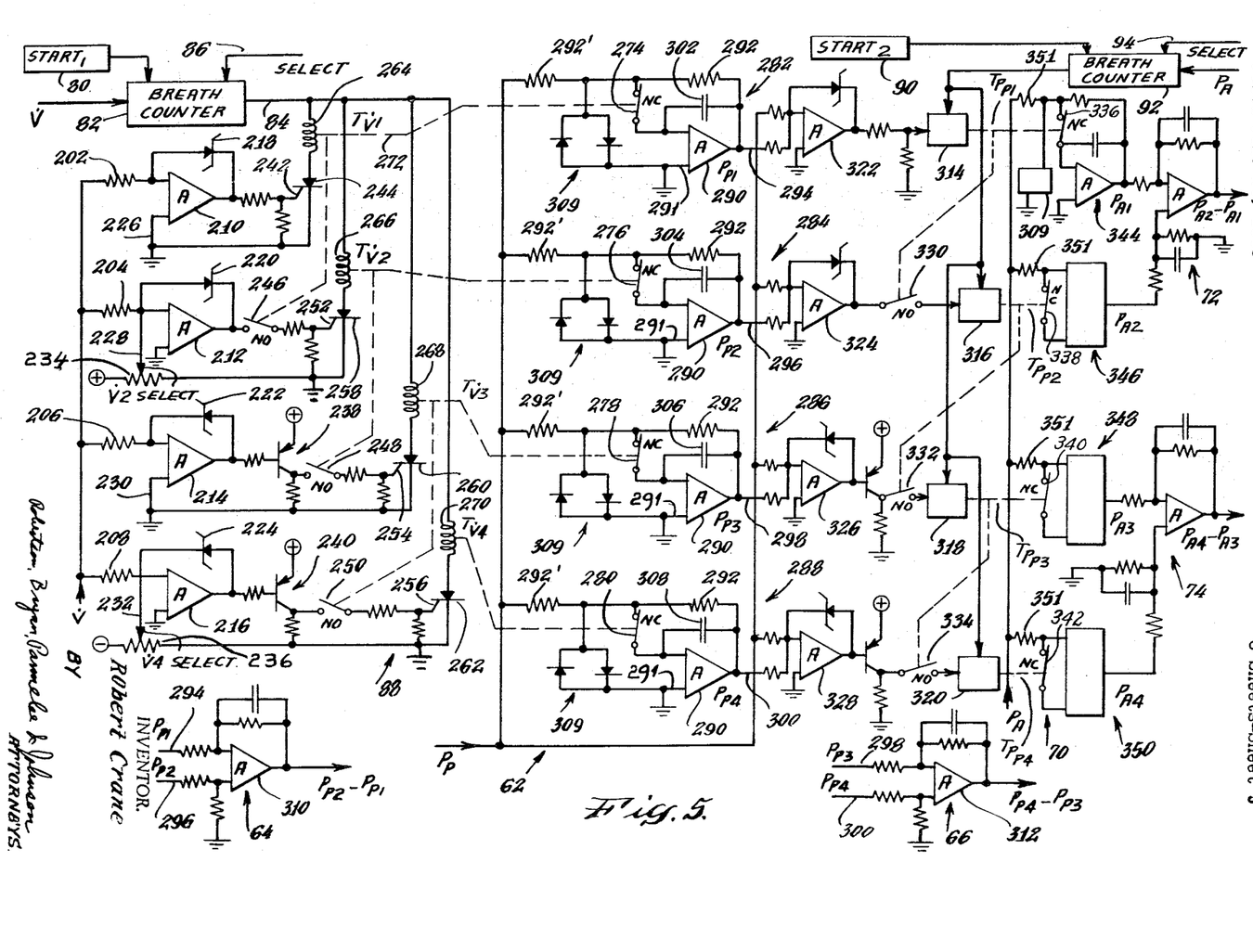
FIG. 5 is a schematic circuit diagram of an automatic system embodying the present invention.

FIG. 5 illustrates an electrical schematic for the timing generators 68, 88, track and hold networks 62 and 70 as well as subtractor networks 64, 66, 72 and 74.

The flow signal $\dot{V}$ is shown fed to a network 88 and feeds through appropriate input resistors 202, 204, 206 and 208 to the inputs of analog logic amplifiers 210, 212, 214, and 216. The analog logic amplifiers are provided with negative feed-back circuits employing Zenor diodes 218, 220, 222 and 224. It is noted that the Zener diodes 222 and 224 are connected in reversed polarity relative to Zener diodes 218 and 220, because the polarity of the flow signal $\dot{V}$ is reversed during the expiratory phase as compared with the inspiratory phase. The connections of diodes 218 and 220 are so selected that the $\dot{V}$ is negative, the output of operational amplifiers 210 and 212 are zero and remain so until the $\dot{V}$ signal exceeds the other input signals 226 and 228. In a similar manner, Zener diodes 222 and 224 are connected across the operational amplifiers 214 and 216 so that when $\dot{V}$ is positive their outputs remain at zero volts. Amplifiers 212 and 216 are provided with threshold selection controls 228 and 232 for setting the predetermined flow value points 2 and 4 on curve 50 (FIG. 4A).

As previously mentioned with reference to the curves in FIG. 4, four flow points are selected, $\dot{V}_1$, $\dot{V}_2$, $\dot{V}_3$ and $\dot{V}_4$. Flow points $\dot{V}_1$ and $\dot{V}_3$ correspond to zero airflow and are made to correspond to zero volts. Hence inputs 226 and 230 are referenced directly to ground as shown in FIG. 5.

As discussed above the flow points $\dot{V}_2$ and $\dot{V}_4$ are usually selected to correspond to $-1$ and $+1$ liters per second, respectively, and inputs 228 and 232 are thus referenced to voltages that correspond to these selected flow rates. Input 228 is variably biased positive by use of a potentiometer 234 connected between a positive supply and ground; whereas input 232 is variably biased negative by use of potentiometer 236 connected between a negative supply and ground.

Each operational amplifier 210, 212, 214 and 216 has its output effectively connected to a control gate of a silicon controlled rectifier (SCR). This SCR connection varies with amplifiers 214 and 216 from that with amplifiers 210 and 212 to accommodate a polarity inversion with series connected transistor phase inverters 238 and 240. Hence, even though the logic outputs of amplifiers 214 and 216 differ in polarity from that of amplifiers 210 and 212, the signals that are eventually applied to the gates of SCR's will be of like polarity.

Except for amplifier 210 which is directly coupled to gate 242 of SCR 244, amplifiers 212, 214, and 216 have their outputs connected through normally open switches 246, 248, and 250 respectively to the gates 252, 254 and 256 of SCR's 258, 260 and 262. Each of the SCR's 244, 258, 260 and 262 interconnects the output line 84 from breath counter 82 through the relay coils 264, 266, 268, 270 to ground.

Hence, when breath counter 82 recognizes the arrival of the selected pant it produces an enabling signal to all of the relay coils 264, 266, 268, and 270 which upon the selected firing of the respectively connected SCR's 244, 258, 260 and 262 close the normally open switches 246, 248, and 250.

The relay coils in network 88 control switches in both networks 88 and 62. Thus, current flow through coil 264 as indicated by the dashed line 272 closes the switch 246 and opens a normally closed switch 274. In like manner coil 266 closes the switch 248 and opens normally closed switch 276, coil 268 closes switch 250 and opens noramlly closed switch 278 and coil 270 opens normally closed switch 280. The interlock operation of the relay coils by means of their control of switches 246, 248 and 250 assures that upon the occurrence of a selected breath, e.g. the third, the timing control signals $TV_1$, $TV_2$, $TV_3$, and $TV_4$, occur as represented by the time sequential actuation explained with reference to the network 88 in FIG. 3.

The plethysmographic pressure selector network 62 is composed of four track and hold circuits 282, 284, 286 and 288 each of which continuously inverts and tracks the electrical input signal $P_p$ until commanded by a control signal $T\dot{V}$ (as evidenced by an opening of the switches 274–280) to store the inverted value of $P_p$. Each of the circuits 282, 284, 286, and 288 is composed of an operational amplifier 290 having a grounded input line 291 and a negative feed back resistor 292, an identical input resistor 292', both operatively connected through the switches 274–280 to the other input of the amplifiers 290. Hence, when the switches 274–280 are closed, the amplifiers 290 invert and follow the input $P_p$ at their outputs 294, 296, 298, 300.

The amplifiers 290 are further each supplied with a negative feed back capacitor 302, 304, 306 and 308 which are shunted by the resistors 292 as long as the switches 274–280 remain closed. However, when a switch is opened, tracking action is terminated, and the voltage accumulated at that time across a capacitor is maintained thereon and represents the value of $P_p$ at the time of opening of the switch. Diode protection networks 309 are employed between inputs of the operational amplifiers 290 to enable substantially instant recovery, when the circuit is switched from the hold mode back to the track mode. This switching back to the track mode occurs at the completion of a measurement "run" on the person. In summary, the amplifier outputs 294–300 respectively store voltages proportional to the plethysmographic pressures $P_{p_1}$, $P_{p_2}$, $P_{p_3}$, and $P_{p_4}$ across capacitors 302–308, upon the sequential opening of their operatively connected switches 274–280.

The subtractions with the sampled and stored plethysmographic pressure signals are performed in the electrical subtractor networks 64 and 66. The networks 64 and 66 are formed of differentially connected linear operational amplifiers 310 and 312. Each of these circuits have a pair of input terminals 294–296, 289–300. Inputs 294–296 are respectively coupled to sampled and stored voltages $P_{p_1}$, and $P_{p_2}$ and inputs 298–300 are respectively coupled to sampled and stored voltages $P_{p_3}$ and $P_{p_4}$. The outputs of amplifiers 310 and 312 provide the differences $P_{p_2} - P_{p_1}$ and $P_{p_4} - P_{p_3}$, and these differences are maintained until a rest line (See FIG. 6) is actuated in the breath counter 82.

Following the completion of the sampling of the plethysmographic pressure $P_p$ during the selected third pant, the shutter valve 40 (See FIG. 1) is suddenly closed by actuation of the switch 90. The person continues to attempt to pant against the now closed shutter 40. Switch 90 also enables breath counter 92 to proceed with counting of attempted pants. When breath counter 92 recognizes the selected third breath (or other as desired) by monitoring the input alveolar signal $P_A$, it applies enabling voltage to relays located in networks 314, 316, 318, and 320 which are like the relay—SCR networks described in relation to comparator 88. Analog logic functions are obtained in comparator 68 in a likewise manner as in network 88 with operational amplifiers 322, 324, 326, and 328. These amplifiers each have an input coupled to $P_p$, the plethysmographic pressure signal and another input coupled to one of the stored $P_p$ voltages in track and hold network 62. The outputs of amplifiers 324, 326, 328 are connected through normally open switches 330, 332 and 334 to the network 316, 318, 320 to perform analog switching functions similar to the comparator 88. The interlocking effect by the relays in the networks 314–320 is similar to that within network 88 in that actuation of the network 314 when $P_p$ equals $P_{p_1}$ generates a timing control signal $^TP_{p_1}$ which closes normally open switch 330 and opens a normally closed switch 336 in network 70.

In a like manner actuation of network 316, when $P_p$ equals $P_{p_2}$, generates a timing control signal $^TP_{p_2}$ which closes normally open switch 332 and opens a normally closed switch 338 in network 70. When $P_p$ equals $P_{p_3}$ network 318 is actuated to generate control timing signal $^TP_{p_3}$ which closes switch 334 and opens normally closed switch 340 in network 70. Finally, as $P_p$ equals $P_{p_4}$ network 320 is actuated to generate timing control signal $^TP_{p_4}$ which causes normally closed switch 342 to open.

The second track and hold network 70 is similar to the first track and hold network 62 except that each of its tracking circuits 344, 346, 348 and 350 track the mouth breathing pressure signal $P_A$ as applied to their inputs through resistors 351. The other inputs to the circuits 344–350 are grounded like input terminals 291 in the first track and hold circuit 62. The circuits 344–350 each invert and track the input signal $P_A$ until under command from the $T_{pp}$ timing and control signals, the input signal $P_A$ is stored on capacitors. Hence, at the completion of the selected attempted pant (when the shutter 40 is closed) detected by breath counter 92, the second track and hold network 70 stores the voltage values of $P_{A_1}$, $P_{A_2}$, $P_{A_3}$, and $P_{A_4}$. A pair of subtractor circuits 72 and 74 are shown with inputs connected respectively to pairs of stored voltages $P_{A_1}$, $P_{A_2}$, and $P_{A_3}$, $P_{A_4}$ to provide in like manner as networks 64 and 66 output difference signals $P_{A_2} - P_{A_1}$ and $P_{A_4} - P_{A_3}$.

Figure 6:
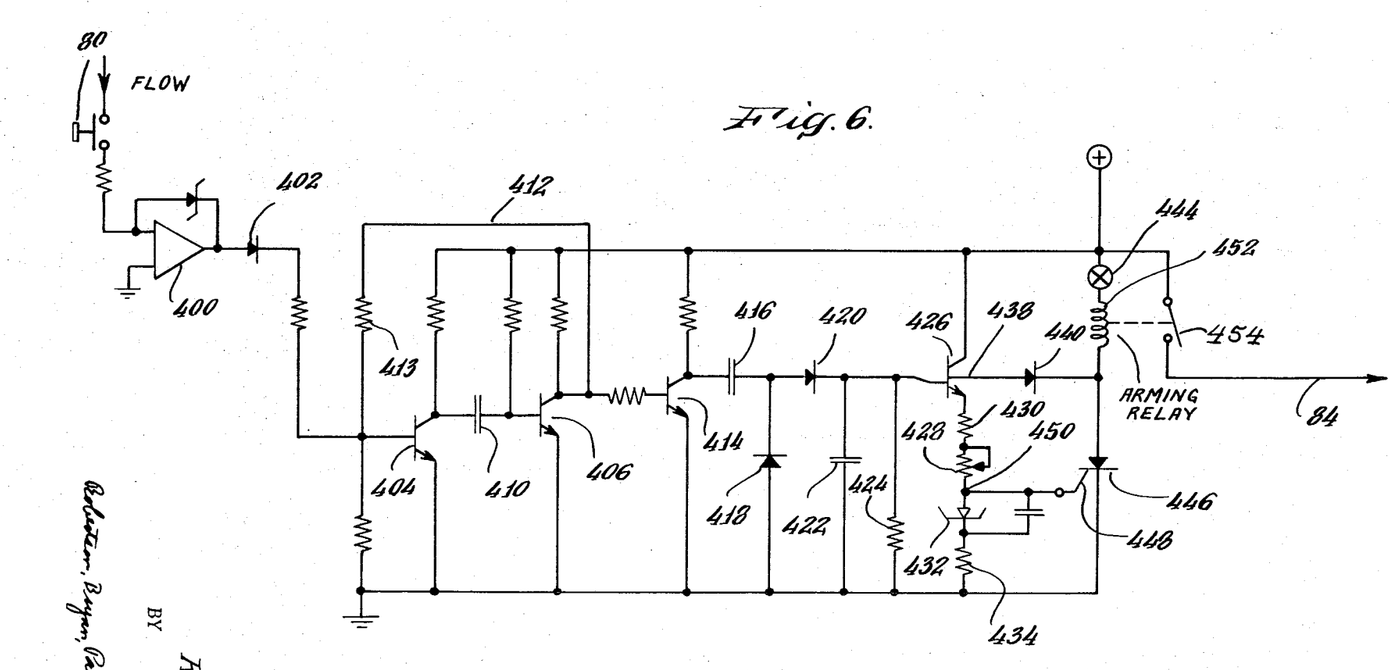
FIG. 6 is a schematic circuit diagram showing details of a breath counting circuit incorporated in the system of FIG. 5.

FIG. 6 illustrates a schematic electrical circuit diagram of breath counter 82 but which may also be used for the breath counter 92. The breath counter shown in FIG. 6 is coupled to the flow signal $\dot{V}$ which is initially applied to an analog logic amplifier 400. The analog logic amplifier provides a voltage suitable for unambiguous breath counting. The amplifier 400 produces a positive output signal when the flow signal $\dot{V}$ crosses through zero volts in a negative going direction. This output signal is coupled through a diode 402 to a one-shot multivibrator including conventionally connected transistors 404 and 406, capacitor 410 and positive feed back line 412 and feed back resistor 413. The positive going output from amplifier 400 produces a rapid cut-off of normally conducting transistor 406. The changing collector voltage of transistor 406 is coupled to a wave form squaring circuit formed by transistor 414 whose collector output is coupled by capacitor 416 to a storage circuit. Capacitor 416 couples positive and negative going spikes with the negative portion of the spike being bypassed to ground by diode 418 and the positive spike being coupled through diode 420 to a storage network. The storage network is formed of a capacitor 422 which is in parallel connection with a high resistance 424 (megohms) to store a voltage. The wave form squaring by transistor 414 assures that a uniform quantum of charge is stored by capacitor 422 each time a breath is detected by amplifier 400. Thus, the voltage on capacitor 422 progressively increases with each attempted pant.

A preselected and controlled discharge path is provided across the capacitor 422 in the form of a four layer switching transistor 426, wherein the base to emitter junction is in series with a potentiometer 428, resistor 430, a tunnel diode 432 and resistor 434 as shown. The collector 436 of the four-layer transistor 426 is connected to a positive supply with the collector gate 438 biased to this supply through a diode 440, an arming relay coil 452 and a reset switch 444. The arming relay coil 452 is connected to ground through an SCR 446 having a control gate 448 connected to the junction 450. The arming relay coil 452 controls a switch 454 which provides the power supply voltage on an output line 84 which as illustrated in FIG. 5 arms the several indicated relay coils.

The operation of the breath selection network is as follows. At a time determined by the operator a start switch 80 which normally prevents voltages from flow signal $\dot{V}$ from passing into the circuit is closed and the person commences to breath through the tube 20 of FIG. 1. Each breath causes a voltage to be accumulated by the capacitor 422, but part of each added voltage is drained off by the discharge circuit. Initially the current in the discharge circuit, is not sufficient to trigger the tunnel diode. The storage of a positive voltage in capacitor 422 in response to a detected breath causes a discharge current to flow through the discharge circuit and the tunnel diode. Subsequently occurring breaths increase the stored voltage and thus the discharge current through the tunnel diode 432 until at a discharge current controlled by potentiometer 428 a switching of the tunnel diode occurs, resulting in an increased potential at junction 450 and causing the gate 448 to fire the SCR 446. Firing of SCR 446 actuates the arming relay coil 452 which in turn energizes the relay coils of the circuit shown in FIG. 5. Once the arming relay is actuated it may only be de-energized by interrupting current flow by means of a series-connected reset switch 444. Reset of the breath counters is not implemented until completion of the breath data acquisition for both open and closed shutter operations.

Among the further advantages provided by the present invention are that this separation of the physiological sensing into respiratory phases enables determination of inspiratory airway resistance $R_{AI}$ and expiratory airway resistance $R_{AE}$. These two physiological values appear to differ from each other in cases of certain individuals, and these two values, being available as a result of this invention, may prove of utility in the analysis of certain pulmonary disease states.

Also, it is an advantage that the respective points 1, 2, 3 and 4 can be paired off in other combinations and permutations, if desired. For example, the points 2 and 4 can be paired to give a difference between $P_{A_4}$ and $P_{A_2}$. This can readily be accomplished by appropriately reconnecting one of the subtractors 72 or 74 to the input signals $P_{A_2}$ and $P_{A_4}$. The resulting difference can be divided by the difference between $\dot{V}_4$ and $\dot{V}_2$ to provide a kind of average airway resistance value and so forth.

What is claimed is:

1. The method of determining that physiological parameter in human beings relating to breathing known as airway resistance comprising the steps of sensing the pressure within a whole body plethysmograph enclosing the entire body of the person for whom the measurement is being made at at least first and second points corresponding respectively to predetermined first and second breathing air flow rates, while the person is breathing air through an open breathing flow path communicating with the air which is contained in the plethysmograph in the space surrounding the person, subsequently obstructing the breathing flow path of the person, sensing the air pressure generated in said path while obstructed at additional first and second points when the pressure within the plethysmograph corresponds to the pressure sensed at said initial first and second points, obtaining the difference between said generated pressures at said additional first and second points, and displaying said difference, thereby to determine the person's airway resistance.

2. The method of measuring the ratio of changes in a person's body displacement relative to changes in alveolar air pressure to determine the physiological parameter relating to breathing known as functional residual capacity comprising the steps of enclosing the person for whom the measurement is being made within a whole body plethysmograph, having the person breath through an unobstructed flow path communicating with the air contained within the plethysmograph in the space surrounding the person's body, sensing the pressure within the plethysmograph surrounding the person at at least first and second points corresponding respectively to predetermined first and second breathing air flow rates while the person is breathing through said unobstructed flow path, obstructing the breathing flow path of the person, sensing the air pressure generated in said path while obstructed at additional first and second points when the pressure within the plethysmograph corresponds to the pressures sensed at said initial first and second points, obtaining the difference between said generated air pressures at said additional first and second points, obtaining the difference between plethysmograph pressures occurring at said initial first and second points, and displaying the ratio between said differences to form an indication of the functional residual capacity of the person.

3. The method of automatically determining physiological respiratory parameters of a person comprising the steps of sensing the pressure within a plethysmograph enclosing a person for whom the respiratory parameters are to be determined, having the person breathe through an unobstructed flow path communicating with the air contained within the plethysmograph in the space surrounding the person's body, selecting a first breath cycle including inspiration and expiration phases of a pant for analysis, storing a first value of the plethysmographic pressure occurring during the first selected breath cycle at a first preselected value of breath flow during the inspiration phase, storing a second value of the plethysmographic pressure occurring during the first selected breath cycle at a second preselected value of the breath flow greater than the first selected breath flow and during the inspiration phase, storing a third value of the plethysmographic pressure occurring during the expiration phase of the selected breath cycle at a third preselected value of the breath flow, storing a fourth value of the plethysmographic pressure occurring during the expiration phase of the first selected breath cycle at a fourth preselected value of the breath flow greater than the third preselected breath flow value, obstructing said breathing flow path of the person, selecting a subsequent breath cycle occurring while the person is panting against the obstructed path, said subsequent selected breath cycle including inspiration and expiration phases of a pant for analysis, sensing a first value of the person's mouth pressure occurring during the selected subsequent cycle inspiration phase at a time when the plethysmographic pressure equals the first stored value, sensing a second value of the person's mouth pressure occurring during the inspiration phase of the selected subsequent cycle at a time when the plethysmographic pressure equals the second stored value, sensing a third value of the person's mouth pressure occurring during the expiration phase of the selected subsequent cycle at a time when the plethysmographic pressure equals the third stored value, sensing a fourth value of the person's mouth pressure occurring during the expiration phase of the selected subsequent cycle at a time when the plethysmographic pressure equals the fourth stored value, obtaining the difference between selected pairs of mouth pressure values and displaying said differences to provide a determination of that respiratory parameter of the person, known as airway resistance.

4. The method of claim 3 including the additional steps of obtaining the difference between predetermined pairs of plethysmograph pressures and taking the ratio of said latter difference to a difference between selected pairs of sensed mouth pressures, and displaying said ratio to provide a determination of the respiratory parameter of the person known as functional residual capacity of the person.

5. A system for the automatic determination of a person's physiological respiratory parameters comprising a whole body plethysmograph, being a cabinet of a size adapted to enclose a person therein in substantially airtight relationship provided with a breathing conduit through which the person breathes, said conduit having a mouthpiece accessible to the person in said plethysmograph and said conduit communicating with the air located within the plethysmograph with the person, means for blocking said conduit, means for sensing plethysmograph air pressure and providing a signal corresponding thereto, means for sensing mouth breath pressure when said conduit is blocked and providing a signal corresponding thereto, means for sensing breath flow of the person through said conduit when said conduit is open and providing a signal corresponding thereto, means for effectively storing signals corresponding to sensed plethysmograph pressures occurring at a pair of preselected sensed breath flow points during an earlier breath cycle with an open conduit, means controlled by said stored signals corresponding to said plethysmograph pressures and effectively responsive to sensed mouth breath pressures occurring with a blocked conduit and occurring during a later breath cycle for selecting a pair of mouth breath pressures when the respective signals corresponding to sensed plethysmograph pressures occurring during said later breath cycle correspond to the respective pair of stored signals resulting from said earlier breath cycle with an open conduit, means for obtaining the difference between the respective signals corresponding to said selected pair of mouth breath pressures, and means for displaying said difference to provide an indication of the airway resistance of the person.

6. A system for automatic determination of a person's physiological respiratory parameters as claimed in claim 5 in which there are means for effectively storing signals corresponding to sensed plethysmograph pressures at preselected sensed breath flow points occurring during both the inspiratory phase and expiratory phase of said earlier breath cycle, and said means controlled by said stored signals corresponding to said plethysmograph pressures are effectively responsive to sensed mouth breath pressures occurring with a blocked conduit during both the inspiratory phase and expiratory phase of said later breath cycle.

7. A system for the automatic determination of a person's physiological respiratory parameters as claimed in claim 5 including interlock means for assuring that said plethysmograph pressures and said mouth breath pressures are sensed in a predetermined sequence during said earlier and said later breath cycles.

8. A system for the automatic determination of a person's physiological respiratory parameters as claimed in claim 6 including interlock means for assuring that said plethysmograph pressures and said mouth breath pressures are sensed in a predetermined sequence during the inspiratory and expiratory phases of said earlier and later breath cycles.

9. A system as claimed in claim 5 including automatic breath counting means for predetermining the respective breath cycle to be used in a series of pants by the person being tested.

10. A system for the determination of a person's physiological respiratory parameters comprising a whole body plethysmograph, being a cabinet of a size adapted to enclose a person therein in substantially airtight relationship, said plethysmograph having a conduit through which the person breathes, one end of said conduit being accessible to the person in said plethysmograph for the person to breathe therethrough and the other end of said conduit communicating with the air located within the plethysmograph with the person, means for blocking said conduit, means for sensing plethysmographic air pressure and producing a signal representative thereof, means for sensing alveolar pressure of the person when said conduit is blocked and producing a signal indicative thereof, means for sensing the breath flow of the person when said conduit is open and producing a signal indicative thereof, means for selecting a predetermined breath of the person and producing an enabling signal representative thereof, means actuated by the enabling signal for selecting sensed plethysmographic pressure signals occurring at preselected sensed breath flows, means controlled by the selected plethysmographic pressure signals and responsive to the alveolar pressure signal for producing signals representative of alveolar pressure when the sensed plethysmograph pressure equals the selected plethysmograph pressures, and means for recording said latter alveolar pressure signals.

11. An apparatus for the determination of a person's functional residual capacity with a whole body plethysmograph adapted to enclose the person in substantially airtight relationship comprising means defining an obstructable breathing path communicating with the air contained within the plethysmograph with the person and having means for obstructing said breathing path, means for sensing plethysmographic pressure and producing a signal representative thereof, means for sensing a mouth breath pressure representative of alveolar pressure of the person occurring when said breathing path is obstructed and producing a signal representative thereof, means for sensing breath flow when said breathing path is unobstructed and producing a signal representative thereof, means for generating sequentially occurring first and second timing signals when the sensed breath flow signal reaches preselected values during a phase of a predetermined breathing cycle, means actuated by the first timing signals for storing the plethysmographic signal values respectively occurring contemporaneously with said first and second timing signals, means comparing the stored plethysmographic pressure signals with the sensed plethysmographic pressure signal when the breathing path is obstructed and during a corresponding breathing cycle phase to generate first and second sequential alveolar timing signals when the compared pressure signals reach a preselected relationship, means actuated by the alveolar timing signals to sequentially store the value of the alveolar pressure signal occurring respectively contemporaneously with said first and second alveolar signals, means for selectively comparing the stored alveolar pressure signals with one another, means for selectively comparing the stored plethysmographic pressure signals with one another, and means for deriving the quotient of the compared plethysmographic pressure signal divided by the alveolar pressure signal and displaying said quotient to indicate the functional residual capacity of the person.

12. The apparatus as claimed in claim 11 wherein the first and second plethysmographic timing signal generating means further includes first and second electrically interlocked breath flow signal comparing circuits, each circuit having a reference voltage respectively related to one of the preselected flow signal values and each circuit being interlocked to sequentially generate a timing signal during the predetermined breathing cycle.

13. The apparatus as claimed in claim 12 wherein the comparing means further includes first and second electrically interlocked plethysmograph pressure signal comparing circuits, each circuit being provided with a reference voltage proportional to one of the stored plethysmograph pressure signals, said plethysmograph comparing circuits being interlocked to sequentially generate an alveolar timing signal during the corresponding breathing cycle phase.

14. An apparatus for the determination of a person's functional residual capacity as claimed in claim 11, including means for generating sequentially occurring third and fourth timing signals when the sensed breath flow signal reaches preselected values during the other phase of said predetermined breathing cycle, means actuated by the third timing signals for storing the plethysmographic signal values respectively occurring contemporaneously with said third and fourth timing signals, means comparing the stored plethysmographic pressure signals with the sensed plethysmographic pressure signal when the breathing path is obstructed and during a corresponding other breathing cycle phase to generate third and fourth sequential alveolar timing signals when the compared pressure signals reach a preselected relationship, means actuated by the third and fourth alveolar timing signals to sequentially store the value of the alveolar pressure signal occurring respectively contemporaneously with said third and fourth alveolar signals, means for selectively comparing the third and fourth stored alveolar pressure signals with one another, means for selectively comparing the third and fourth stored plethysmographic pressure signals with one another, and means for deriving the quotient of the compared third and fourth plethysmographic pressure signals divided by the compared third and fourth alveolar pressure signals and displaying said quotient to indicate the functional residual capacity of hte person.

(References on following page)

References Cited

UNITED STATES PATENTS 3,511,237   5/1970   Jaeger ------------- 128—2.08

FOREIGN PATENTS 474,996   8/1969   Switzerland   Muysers

OTHER REFERENCES

Bartlett, Jr., et al., Journal of Applied Physiology, vol. 14, (1959) pp. 89–96. Comroe, J. H., et al., Journal of Applied Physiology, vol. 14 (1959), pp. 439–444. DuBois, A. B., et al., Article from Dept. of Physiology and Pharmacology, Grad. School of Med., Univ. of PA. (Accepted for Publication, December 1955), Jaeger, M. J., et al., Journal of Applied Physiology, vol. 19, No. 4, July 1964 (pp. 813–820).

RICHARD A. GAUDET, Primary Examiner

K. L. HOWELL, Assistant Examiner